United States Patent
Das et al.

(10) Patent No.: US 9,264,123 B2
(45) Date of Patent: Feb. 16, 2016

(54) ANTENNA ACTIVITY DETECTION IN MULTI-ANTENNA COMMUNICATION

(71) Applicant: ST-Ericsson SA, Plan-les-Ouates (CH)

(72) Inventors: Sajal Kumar Das, Bangalore (IN); Suyog Moogi, Bangalore (IN); Leela Srikar Muppirisetty, Andhra Pradesh (IN); Deepak Varshney, Dresden (DE)

(73) Assignee: ST-ERICSSON SA, Plan-les-Ouates (CH)

( * ) Notice: Subject to any disclaimer, the term of this patent is extended or adjusted under 35 U.S.C. 154(b) by 0 days.

(21) Appl. No.: 14/364,836

(22) PCT Filed: Dec. 7, 2012

(86) PCT No.: PCT/EP2012/074800
§ 371 (c)(1),
(2) Date: Jun. 12, 2014

(87) PCT Pub. No.: WO2013/087532
PCT Pub. Date: Jun. 20, 2013

(65) Prior Publication Data
US 2015/0023400 A1    Jan. 22, 2015

Related U.S. Application Data
(60) Provisional application No. 61/594,483, filed on Feb. 3, 2012.

(30) Foreign Application Priority Data

Dec. 13, 2011  (IN) .......................... 3630/DEL/2011

(51) Int. Cl.
*H04L 27/01* (2006.01)
*H04B 7/08* (2006.01)
(Continued)

(52) U.S. Cl.
CPC ............ *H04B 7/0808* (2013.01); *H04B 7/0404* (2013.01); *H04B 17/007* (2013.01);
(Continued)

(58) Field of Classification Search
CPC ............. H04B 17/318; H04B 17/0057; H04B 17/102; H04B 17/17
See application file for complete search history.

(56) References Cited

U.S. PATENT DOCUMENTS

| 5,396,645 A | 3/1995 | Huff |
| 2004/0127261 A1 | 7/2004 | Endress |

(Continued)

FOREIGN PATENT DOCUMENTS

| WO | 2008/073010 A1 | 6/2008 |
| WO | 2012/119269 A1 | 9/2012 |

OTHER PUBLICATIONS

International Search Report issued in corresponding International application No. PCT/EP2012/074800, date of mailing Mar. 26, 2013.
(Continued)

*Primary Examiner* — Shuwang Liu
*Assistant Examiner* — David S Huang
(74) *Attorney, Agent, or Firm* — Patent Portfolio Builders PLLC (57) ABSTRACT

The present subject matter discloses a method for antenna activity detection in multi-antenna communication devices. In one embodiment, the method comprises computing a received signal strength indicator (RSSI) value for each of a plurality of antennas based on a sampled data associated with each of the antennas. The RSSI values may then be analyzed to identify an antenna having a highest RSSI value as a primary antenna and one or more antennas having the RSSI value less than the highest RSSI value as auxiliary antennas. Further, an RSSI difference for each of the auxiliary antennas is calculated and compared with a first threshold value to ascertain one or more potentially inactive antennas from among the auxiliary antennas. The potentially inactive antennas may then be further analyzed to identify one or more inactive antennas based at least in part on the RSSI value.

17 Claims, 2 Drawing Sheets

(51) Int. Cl.
*H04B 17/318* (2015.01)
*H04B 7/04* (2006.01)
*H04B 17/00* (2015.01)
*H04L 25/03* (2006.01)
*H04B 17/26* (2015.01)
*H04B 17/29* (2015.01)

(52) U.S. Cl.
CPC ............ *H04B17/008* (2013.01); *H04B 17/318* (2015.01); *H04L 25/03891* (2013.01); *H04B 7/0877* (2013.01); *H04B 17/26* (2015.01); *H04B 17/29* (2015.01)

(56) References Cited

U.S. PATENT DOCUMENTS

2006/0003773 A1\* 1/2006 Miyata et al. .............. 455/452.2
2012/0270537 A1\* 10/2012 Weng et al. .................. 455/424

OTHER PUBLICATIONS

Written Opinion of the International Searching Authority issued in corresponding International application No. PCT/EP2012/074800, date of mailing Mar. 26, 2013.

\* cited by examiner

ANTENNA ACTIVITY DETECTION IN MULTI-ANTENNA COMMUNICATION

TECHNICAL FIELD

The present subject matter relates, in general, to communication devices and, in particular, to detection of antenna activity in communication devices having multiple antennas.

BACKGROUND OF THE SUBJECT MATTER

With advancement in technology, communication devices with multiple antennas have been widely used to receive signals propagating through multiple paths, providing antenna diversity, also known as space diversity. Providing the antenna diversity facilitates in improving the bit error rate (BER) quality and reliability of a wireless link. Additionally, multiple antennas offer a receiver several observations of the same transmitted signal. For instance, each of the multiple antennas may experience a different interference environment. Thus, if one antenna is experiencing a deep fade, another antenna may receive a better signal. Further, such communication devices typically implement a multiple antenna equalizer (MAEQ) that equalizes samples of the signals received by each of the multiple antennas based on correlation properties of the received signals. Using the signals received by all the antennas allows the MAEQ to provide better noise reduction, higher gain, and better interference cancellation as compared to communication devices having only a single antenna.

However, in order to achieve the aforementioned advantages, the signals received by the multiple antennas need to be un-correlated, due to which the multiple antennas need to be separated by a particular distance. Separating the antennas by the particular distance, however, may not be always possible, for example, in handheld communication devices due to their small size.

Further, in situations where one or more of the antennas from amongst the multiple antennas becomes inactive, i.e., faulty or grounded, the particular antenna may not receive any signals and may accordingly generate only noise signals at its output. The MAEQ, in such a case, may not be able to identify that a particular antenna has become inactive and may include the noise signal as one of its input signals for equalizing, resulting in a higher bit error rate (BER), and thus, leading to a degradation in performance of the communication device.

In order to avoid aforementioned complexities, manufacturers may implement a single antenna equalizer (SAEQ) configured to equalize signals from only one of the multiple antennas or may simply provide the communications devices with only a single antenna. However, using either the single antenna or SAEQ with multiple antennas may degrade the performance of the communication devices as the SAEQ may not be able to provide interference suppression similar to the MAEQ.

Manufacturers of a communication device may thus need to decide upon a multiple antenna implementation for the communication device considering the benefits, such as high interference suppression, and limitations, such as increased cost and high BER in case of an antenna being rendered inactive. The SAEQ or the MAEQ is accordingly implemented in the communication device depending upon whether the communication device has a single antenna implementation or a multiple antenna implementation.

SUMMARY

This summary is provided to introduce concepts related to a method and a device for antenna activity detection in a multi-antenna communication device. The concepts are further described below in the detailed description. This summary is not intended to identify essential features of the claimed subject matter nor is it intended for use in determining or limiting the scope of the claimed subject matter.

In a first aspect, the method of detecting antenna activity in a multi-antenna communication device comprises computing a received signal strength indicator (RSSI) value for each of a plurality of antennas based on a sampled data associated with each of the antennas. In one implementation, based on the RSSI values, an antenna having a highest RSSI value as is identified as a primary antenna and one or more antennas having the RSSI value less than the highest RSSI are identified as auxiliary antennas. Further, an RSSI difference is calculated for each of the auxiliary antennas. In one implementation, the RSSI difference corresponding to an auxiliary antenna is a difference between the RSSI value corresponding to the primary antenna and the RSSI value corresponding to the auxiliary antenna. Further, the RSSI difference corresponding to each of the auxiliary antenna is compared with a first threshold value to ascertain one or more potentially inactive antennas from among the auxiliary antennas. The potentially inactive antennas may then be further analyzed to identify one or more inactive antennas based at least in part on the RSSI value. Further, in one implementation, each of the potentially inactive antennas having a variation in burst differences less than a second threshold value is tagged as an inactive antenna. Each of the potentially inactive antennas having the variation in the burst differences greater than the second threshold value is, on the other hand, tagged as an active antenna.

In a second aspect, the subject matter concerns a computer program product comprising a computer readable medium, having thereon a computer program comprising program instructions. Further, the computer program is loadable into a data-processing unit and adapted to cause execution of the method according to the first aspect of the subject matter.

In a third aspect, the subject matter concerns a method for dynamic selection of an equalizer in a multi-antenna communication device. In one embodiment, the method for dynamic selection of an equalizer comprises identifying one or more potentially inactive antennas from a plurality of antennas, based on an RSSI value corresponding to each of the antennas. Further, each of the potentially inactive antennas having a variation in burst differences less than a second threshold value is tagged as an inactive antenna. Each of the potentially inactive antennas having the variation in the burst differences greater than the second threshold value is on the other hand tagged as an active antenna. In one implementation, a burst difference for a potentially inactive antenna is determined as a difference between RSSI values of two consecutive bursts of a signal received by the potentially inactive antenna. An equalizer may be subsequently initiated based at least on a number of antennas tagged as active antenna.

In a fourth aspect, the subject matter concerns a computer program product comprising a computer readable medium, having thereon a computer program comprising program instructions. Further, the computer program is loadable into a data-processing unit and adapted to cause execution of the method according to the third aspect of the subject matter.

In a fifth aspect, the subject matter concerns an antenna activity detector configured to determine antenna activity in a multi-antenna communication device. In one embodiment, the antenna activity detector includes a received signal strength module and an inactive antenna determination module. The received signal strength estimation module is configured to compute an RSSI value for each of a plurality of antennas based on sampled data associated with each of the plurality of antennas. The RSSI value is then used by the inactive antenna determination module to identify an antenna having a highest RSSI value as a primary antenna and one or more antennas having the RSSI value less than the highest RSSI value as auxiliary antennas. The inactive antenna determination module subsequently ascertains one or more potentially inactive antennas from the auxiliary antennas based on the RSSI values. The inactive antenna determination module further determines one or more inactive antennas from the potentially inactive antennas, based at least in part on the RSSI values corresponding to each of the potentially inactive antennas. In one implementation, the inactive antenna may be one of a faulty or a grounded antenna.

In a sixth aspect, the subject matter concerns a communication device. In one embodiment, the communication device includes an inactive antenna determination module and an equalization module. The inactive antenna determination module is configured to identify, from a plurality of antennas, an antenna having a highest RSSI value as a primary antenna and one or more antennas having the RSSI value less than the highest RSSI value as auxiliary antennas. The inactive antenna determination module further ascertains one or more potentially inactive antennas from the auxiliary antennas based on the RSSI values. Subsequently, the inactive antenna determination module determines one or more inactive antennas from the potentially inactive antennas based on a variation in at least two burst differences. In one implementation, a burst difference for a potentially inactive antenna may be defined as a difference between RSSI values of two consecutive bursts of a signal received by the potentially inactive antenna. Based on the one or more inactive antennas, the equalization module selects one of single antenna equalization module and a multi-antenna equalization module provided in the equalization module.

BRIEF DESCRIPTION OF THE DRAWINGS

The detailed description is provided with reference to the accompanying figures. In the figures, the left-most digit(s) of a reference number identifies the figure in which the reference number first appears. The same numbers are used throughout the drawings to reference like features and components. For simplicity and clarity of illustration, elements in the figures are not necessarily to scale. Some embodiments of devices and/or methods in accordance with embodiments of the present subject matter are now described, by way of example only, and with reference to the accompanying figures, in which.

DETAILED DESCRIPTION

Devices and methods for antenna activity detection in multi-antenna communication devices are described herein. The devices and methods can be implemented in a variety of communication devices. Additionally, the methods and devices can be implemented in any communication device operating on any of the communication networks, such as Global System for Mobile Communication (GSM) network, Enhanced Data rates for GSM Evolution (EDGE) network, Universal Mobile Telecommunications System (UMTS) network, Time Division Multiple Access (TDMA) network, Code Division Multiple Access (CDMA) network, Next Generation Network (NGN), satellite networks, and Long Term Evolution (LTE). Although the description herein is with reference to certain communication networks, the systems and methods may be implemented in other communication networks and devices, albeit with a few variations, as will be understood by a person skilled in the art.

Typically, in a communication network, signals transmitted over a channel may get lost or impaired due to various channel impairments, such as noise, interferences, and multipath propagation. As would be well known to those skilled in the art, noise in the channel is typically caused due to distortions while interferences are typically caused, for example, by operation of other communication devices. Multipath propagation occurs when the transmitted signals travel through multiple paths of propagation to reach the communication device. In order to improve recovery of an estimated signal that is substantially similar to the originally transmitted signal, from a received signal, various equalization techniques are generally implemented in the communication device. Conventional communication devices typically include a single antenna and employ a single antenna equalizer (SAEQ) that equalizes signals received by the single antenna to provide equalized data for demodulation.

Recent developments have led to wide spread use of communication devices with multiple antennas to improve reception of signals propagating through multiple paths for achieving space diversity gain. Such communication devices typically implement a multiple antenna equalizer (MAEQ) that equalizes samples of the signals received from each of the multiple antennas to provide equalized data for demodulation. However, if one of the antennas from amongst the multiple antennas becomes inactive, i.e., it becomes faulty due to a loose connection, or does not receive any signal, or is grounded, the particular antenna may have only noise signals at its output. The MAEQ, in such a case, may not be able to identify that the particular antenna has become inactive and may include the noise signal as one its input signals for equalizing thus leading to degradation in performance of the communication device. Further, implementing the MAEQ in the communication devices may result in additional costs in terms of hardware installations and power consumption.

Thus, for a given communication device, its manufacturer decides whether the communication device would include a single antenna or multiple antennas based on the pros and cons of both the implementations and the communication device, and accordingly implements the SAEQ or the MAEQ, respectively. Once it is decided that a communication device would include multiple antennas, the MAEQ is configured in to the communication device. For such devices, an option to use the SAEQ is unavailable. However, even if the manufacturer implements the MAEQ, the communication device including multiple antennas may need to be operated using input from only a single antenna, in some cases.

In one example, if during run time one or more of the multiple antennas become faulty or inactive, the communication device may need to be operated using input from only a single antenna, in which case, the MAEQ may not be the most appropriate equalizer since the MAEQ would take noise as the input from the inactive antenna. Accordingly, in this case, the SAEQ may be a suitable equalizer, however, an option to revert to the SAEQ may not be available in the conventional communication device including multiple antennas.

In another example, testing of the multi-antenna communication devices may require testing the communication device for MAEQ as well as other legacy single antenna related tests. For example, in GSM/EDGE Radio Access Network (GERAN) based communication devices, the 3rd Generation Partnership Project (3GPP) standards require the multi-antenna communication devices to be tested for Mobile Station Reception Diversity (MSRD) tests and other legacy tests, such as blocking and spurious Fourier emission tests, Co-Channel Interference (CCI) tests, sensitivity test cases, and adjacent channel test interference. An MSRD equalizer is a dual antenna equalizer and the MSRD test thus utilizes signals received from dual antennas. Legacy tests, such as the blocking test and the spurious tests provided in TS 51.010 of 3GPP on the other hand utilize signals from a single antenna only. Testing dual-antenna communication devices for such legacy tests would thus require test labs to either enable only a main antenna to receive signals and disable all other auxiliary antennas or to provide correlated signals to all the antennas so that the MSRD equalizer may work similar to other legacy equalizers.

In order to provide correlated signals to all the antennas, the test labs need to have upgraded testing equipments, thus increasing the costs of such tests. Enabling only the main antenna, on the other hand, requires the test labs to either ground or terminate the auxiliary antennas with matched load. Grounding or terminating the auxiliary antennas may degrade the performance of the communication device as the MAEQ may use noise signals from the auxiliary antennas. In other words, the MAEQ is configured to operate on signals from more than one antenna and may result in degraded performance in cases where a test requires to be carried out using signals from only one antenna.

Accordingly, pre-configuring the communication devices to operate using only the MAEQ may thus not be preferred in various situations as operating the MAEQ using only a single input signal may adversely affect the performance of the communication device. Thus, in the absence of any system for dynamic switching between the equalizers, the manufacturers are required to either implement the SAEQ based communication devices or use the MAEQ based communication devices with its various limitations.

The present subject matter, discloses a device and a method for detecting antenna activity in multi-antenna communication devices that may be used for dynamic switching of equalizers. Data transmitted in the form of a transmitted signal, by one or more transmitters, such as a transmission unit of a fixed base station or a test equipment is received, as a received signal, by a communication device, such as a cellular phone, a personal digital assistant, or a portable computer. The transmitted signal propagates over a physical medium, usually referred to as a channel, to reach the communication device. Typically, the transmitted signal propagates over multiple paths of propagation to reach the communication device as multiple radio frequency (RF) signals. The multiple RF signals are received by multiple antennas connected to the communication device. The RF signals received by all the antennas are then processed and sampled to obtain sampled data corresponding to each of the plurality of antennas.

A received signal strength indicator (RSSI) value is subsequently computed for each of the plurality of antennas based on the sampled data. The RSSI value corresponding to each of the antennas is then used to detect antenna activity of each of the plurality of antennas. The antenna activity may be understood as a measure to determine whether an antenna is active or inactive. Inactive antennas may be defined as the antennas that receive no or weak input signals and thus have low or no activity. For example, an antenna receiving signal having signal strength below a threshold, such that the received signal may not be utilized for further signal processing, may be understood as a low activity antenna. The inactive antennas, as would be understood by a person skilled in the art, may include faulty antennas, i.e., antennas that become faulty due to a loose connection; non-functional antennas, i.e., antennas that are connected but do not receive any signal; grounded antennas; and antennas that have been terminated using matched load. Active antennas, on the other hand, may be understood as the antennas receiving strong input signals that may be utilized for further signal processing. The RSSI values corresponding to each of the antennas are subsequently compared to identify an antenna corresponding to a highest RSSI value as a primary antenna and one or more antennas having the RSSI value less than the highest RSSI value as auxiliary antennas.

Auxiliary antennas, along with their RSSI values, are then analyzed to identify potentially inactive antennas. Initially, for each of the auxiliary antennas, an RSSI difference is calculated. The RSSI difference for an antenna, in one example, may be understood as a difference between the highest RSSI value, i.e., the RSSI value of the primary antenna, and the RSSI value corresponding to the antenna. The RSSI difference for each of the auxiliary antennas is then compared with a first threshold value to determine all the auxiliary antennas having the RSSI difference greater than the first threshold value as the potentially inactive antennas, i.e., antennas having low or zero activity. The auxiliary antennas having the RSSI difference less than the first threshold value are on the other hand identified as the active antennas and added to a list of active antennas.

In one embodiment, the potentially inactive antennas may be further analyzed to verify whether the potentially inactive antennas are inactive or not. In one implementation, the verification for a particular potentially inactive antenna is done based on a variation in burst differences corresponding to each of the potentially inactive antennas. The burst difference for a potentially inactive antenna, in one example, may be understood as a difference between RSSI values of the consecutive bursts of the RF signal corresponding to the potentially inactive antenna. The variation in burst differences for each of the potentially inactive antenna is then compared with a second threshold value to determine whether the potentially inactive antenna is an inactive antenna or an active antenna.

Based at least on number of inactive antennas and active antennas, either of a SAEQ mode or a MAEQ mode may be subsequently initiated to equalize the sample data corresponding to the RF signals received by the communication device. For instance, if only a single antenna is active, SAEQ mode may be initiated, whereas if more than one antenna is active, the MAEQ mode may be initiated.

Additionally, the SAEQ mode or the MAEQ mode may be initiated based on a set of predetermined parameters. For example, the communication device may be pre-configured to work in the SAEQ mode, in such a case, the SAEQ mode may be initiated to use the sampled data corresponding to the primary antenna for equalization.

Thus, the devices and methods of the present subject matter facilitate the detection of antenna activity in a multi-antenna communication device to determine active and inactive antennas. Determining the active antennas from among the multiple antennas helps in improving the recovery of an estimate of the originally transmitted signal as using inputs from only the active antennas ensures that noise signals are not considered for processing. Additionally, using the technique of comparing the RSSI values for detecting the active antennas helps in estimating antennas having the best reception of the RF signal, thus improving the performance of the communication device. Further, detecting the inactive antennas facilitates the communication devices in switching between SAEQ or MAEQ mode, thus allowing the manufacturers to implement both the equalizers in the same communication device. Implementing both the SAEQ and the MAEQ in the communication device not only helps in improving the operation of the communication devices but also facilitates lab testing of MAEQ enabled communication device using legacy test equipments. These and other advantages would be described in greater detail in conjunction with the following figures.

Although the methods and device of antenna activity detection in a multi-antenna communication device have been described in context of dynamic selection of an equalizer, it will be appreciated that the methods and device may have various other applications as will be obvious to a person skilled in the art. For instance, the methods and devices may be implemented for detecting grounded or faulty antennas. Detecting the grounded or faulty antennas may alternately help in testing dual-antenna or multi-antenna communication devices for legacy tests. Further, the methods and device may also be used for improving the reception of the input signal by weighing the received signals based on corresponding RSSI values and adding the received signals coherently before equalization. Additionally, the methods and device may also be used selecting and equalizing sampled data corresponding only to a set of optimum antennas.

It should be noted that the description and the figures merely illustrate the principles of the present subject matter. It will thus be appreciated that those skilled in the art will be able to devise various arrangements that, although not explicitly described or shown herein, embody the principles of the present subject matter and are included within its spirit and scope. Moreover, all statements herein reciting principles, aspects, and embodiments of the present subject matter, as well as specific examples thereof, are intended to encompass equivalents thereof.

It will be appreciated by those skilled in the art that the words during, while, and when as used herein are not exact terms that mean an action takes place instantly upon an initiating action but that there may be some small but reasonable delay, such as a propagation delay, between the initial action, and the reaction that is initiated by the initial action. Additionally, the word "connected" is used throughout for clarity of the description and can include either a direct connection or an indirect connection. The descriptions and details of well-known components are omitted for simplicity of the description.

Figure 1:
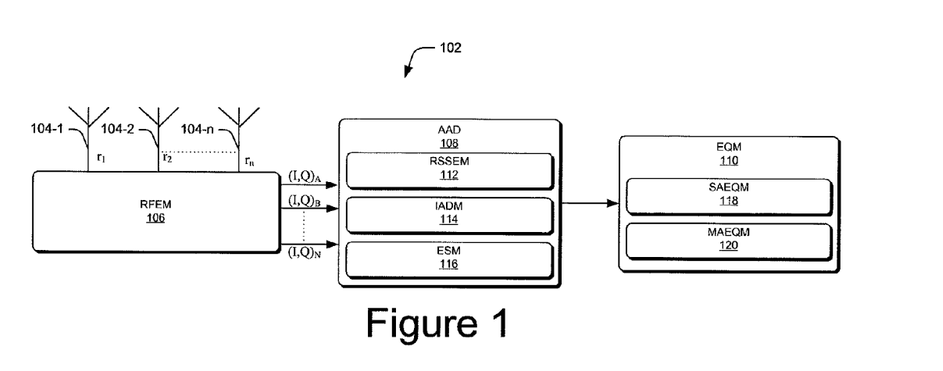
FIG. 1 illustrates a multi-antenna communication device for antenna activity detection, according to an embodiment of the present subject matter.

FIG. 1 illustrates components of a multi-antenna communication device 102 configured to detect activity of each of a plurality of antennas associated with the multi-antenna communication device 102. The multi-antenna communication device, hereinafter referred to as the communication device 102, may include, without limitation, hand-held devices, laptops, tablets or other portable computers, smart phones, mobile phones, global positioning system (GPS) receivers, satellite phones, radio phones, personal digital assistants (PDAs), and the like. Each of the communication devices 102 works on a communication protocol as defined by a network (not shown in the figure) to which the communication device 102 is coupled.

In one embodiment, the communication device 102 includes one or more antennas 104-1, 104-2, . . . , 104-$n$ connected to a receiver front-end module (RFEM) 106, an antenna activity detector (AAD) 108, and an equalization module (EQM) 110. Further the communication device 102 may also include other module(s) (not shown in the figure). The other module(s) may include programs or coded instructions, such as operating systems, that supplement applications and functions of the communication device 102. In one implementation, the RFEM 106, the AAD 108, and the EQM 110 may be implemented in a receiver unit (not shown in the figure) of the communication device 102.

In operation, an originally transmitted signal, i.e., a signal transmitted by one a transmitter, such as a transmission unit of a fixed base station or a test equipment is received by the communication device 102 as a received signal. The transmitted signal propagates over a physical medium, usually referred to as a channel, to reach the communication device 102. Further, as will be understood, the transmitted signal may propagate over multiple paths of propagation to reach the communication device 102 as multiple radio frequency (RF) signals, represented by $(r_1), (r_2), \ldots,$ and $(r_n)$ in the figure. In one implementation, the multiple RF signals are received by the one or more antennas 104-1, 104-2, . . . , 104-$n$, collectively referred to as the multiple antennas 104 and individually referred to as an antenna 104. Each of the multiple antennas 104 is configured to receive at least one of the multiple RF signals. The multiple RF signals, hereinafter referred to as received signals, are then processed and sampled to obtain sampled data corresponding to each of the multiple antennas 104.

To obtain the sampled data, each of the received signals is provided to the RFEM 106. The RFEM 106 is configured to down-convert each of the received signals to generate a baseband received signal. In one implementation, the RFEM 106 initially amplifies the received signals by applying a predetermined gain (G) to each of the received signals to obtain an amplified received signal. The amplified received signal is subsequently mixed with a reference signal, for example, a local carrier signal generated by a Local Oscillator (not shown in the figure) connected to the RFEM 106. A down-converted signal, i.e., the baseband received signal thus received is sampled using an analog to digital converter (not shown in the figure) provided in the RFEM 106 to obtain the sampled data corresponding to each of the multiple antennas 104. In one implementation the sampled data includes m number of complex inphase (I) and quadrature phase (Q) signals associated with each received signal.

For instance, in GSM systems, 156 complex (I, Q) signals are sampled from each received burst of the received signal. The sampled data, represented as $(I, Q)_A, (I, Q)_B, \ldots, (I, Q)_N$ in the figure, associated with each of the multiples antennas 104 are provided to the AAD 108 for detection of one or more inactive antennas from among the multiple antennas 104. In one embodiment, the AAD 108 includes a received signal strength estimation module (RSSEM) 112, an inactive antenna determination module (IADM) 114, and an equalizer selection module (ESM) 116.

For the ease of explanation, in one example, it may be considered that the communication device 102 comprises 4 antennas, i.e., a first antenna 'A', a second antenna 'B', a third antenna 'C', and a fourth antenna 'D'. Further, in said example, the communication device 102 may be assumed to be operating in GSM network. Such an implementation, however, should not be construed as a limitation since the subject matter extends to communication devices comprising any number of antennas and operating in any communication network.

In operation, the RSSEM 112 receives the sampled data associated with each of the multiple antennas 104 from the RFEM 106 to compute a received signal strength indicator (RSSI) value for each of the multiple antennas 104. The RSSEM 112 initially computes an estimated signal strength (rssi) for each of the multiple antennas 104 based on the associated sampled data. In one implementation, the estimated signal strength is calculated using the following equation:

$$\text{rssi\_}N(n) = \{\Sigma_{m=0}^{m=M}\sqrt{Im^2+Qm^2}\} \quad (1)$$

where, N=no of the multiple antennas 104 connected to the communication device 102; n=nth burst of the received signal considered corresponding to the $N^{th}$ Antenna; m=no of samples considered for each burst ranging from 0 to M, for example, M=156 for GSM signals, rssi_N(n) =estimated signal strength corresponding to the $n^{th}$ burst of the $N^{th}$ antenna. For instance, the RSSEM 112 may compute the estimated signal strength for the antenna 'A' as follows:

$$\text{rssi\_}A(n) = \{\Sigma_{m=0}^{m=156}\sqrt{Im^2+Qm^2}\}$$

The estimated signal strength is subsequently used to compute the RSSI value corresponding to each of the multiple antennas 104. In one implementation, the RSSEM 112 processes the estimated signal strength to compensate for the gain applied to each of the received signal to obtain the RSSI value for the antenna 104 corresponding to the received signal. In one embodiment, the RSSEM 112 may compute the RSSI value by subtracting the gain from the estimated signal strength using the following equation:

$$\text{RSSI\_}N(n) = \text{rssi\_}N(n) - G_N (\text{dB}) \quad (2)$$

where, $G_N$ dB=gain applied to the RF signal in the RFEM 106; RSSI_N(n)=RSSI value corresponding to the $n^{th}$ burst of the $N^{th}$ antenna. For instance, the RSSEM 112 may compute the RSSI value for the antenna 'A' as follows:

$$\text{RSSI\_}A(n) = \text{rssi\_}A(n) - G_A (\text{dB}) \quad (2a)$$

Similarly, the RSSI values for the antennas 'B', 'C', and 'D' may be computed as RSSI_B(n), RSSI_C(n), and RSSI_D(n). The RSSI value corresponding to each of the multiple antennas 104 defines a measure of the activity of the antennas 104 and is used to detect active and inactive antennas from the multiple antennas 104. For instance, an antenna having a high RSSI value may be termed as active, while an antenna having a low RSSI value may be termed as less active or inactive.

In one implementation, the RSSEM 112 provides a list of the multiple antennas 104 along with their RSSI values to the IADM 114. The IADM 114 subsequently compares the RSSI values corresponding to each of the multiple antennas 104 to arrange the multiple antennas 104 in a descending order of their activity. In one example, the IADM 114 may generate a list having the multiple antennas 104 arranged in a descending order. The list may then be saved for further processing. Further, the IADM 114 identifies, from the multiple antennas 104, an antenna 104 having a highest RSSI value as a primary antenna and one or more antennas having the RSSI value less than the highest RSSI value as auxiliary antennas. The primary antenna may thus be understood to show the highest activity, whereas the auxiliary antennas may be understood to be less active than the primary antenna.

Referring to the example considered above, the IADM 114 may compare the RSSI values for the antennas A, B, C, and D, i.e., RSSI_A(n), RSSI_B(n), RSSI_C(n), and RSSI_D(n) respectively, to identify the highest RSSI value, say RSSI_A (n). Based on the comparison, the IADM 114 may then identify the Antenna 'A' corresponding to the RSSI_A(n) as the primary antenna. Further, the remaining antennas, i.e., antenna 'B', C', and 'D' in the above example, may be referred to as auxiliary antennas.

The IADM 114 may then analyze the auxiliary antennas along with their RSSI to identify potentially inactive antennas. The potentially inactive antennas may be understood as the antennas 104 from among the multiple antennas 104 that display low activity and may be inactive. The IADM 114 initially calculates an RSSI difference for each of the auxiliary antennas. The RSSI difference for an antenna 104 may be understood as a difference between the highest RSSI value, i.e., the RSSI value of the primary antenna, and the RSSI value corresponding to the antenna 104. In one implementation, the RSSI difference for each of the auxiliary antennas may be calculated by the IADM 114 using the following equation:

$$\text{RSSI\_Difference\_Ant\_}N(n) = (\text{RSSI\_PrimaryAntenna}[n] - \text{RSSI\_Ant\_}N(n)) \quad (3)$$

For instance, the IADM 114 may calculate the RSSI difference for the antenna 'B' and 'C' in accordance with equation (3) as:

$$\text{RSSI difference(antenna }B) = \text{'RSSI\_}A(n) - \text{RSSI\_}B(n)\text{'} \quad (3a),\text{ and}$$

$$\text{RSSI difference(antenna }C) = \text{'RSSI\_}A(n) - \text{RSSI\_}C(n)\text{'} \quad (3b).$$

The IADM 114 then compares the RSSI difference for each of the auxiliary antennas with a first threshold value to determine whether the auxiliary antenna is a potentially inactive antenna or an active antenna. The first threshold value, for example, may be determined based on one or more parameters, such as system simulation or inter-burst RSSI fluctuations. Further, depending on various criteria, such as mobile communication network in which the communication device is operating and 3GPP GERAN requirements, the RSSI fluctuations may be in a range of about +/−4 dB, for example, an absolute difference of 8 dB in the RSSI fluctuation may be allowed as the first threshold value. In one implementation, the first threshold value may be predetermined. In another implementation, the first threshold value may be dynamically determined.

Based on the comparison, the IADM 114 identifies the potentially inactive antennas and active antennas from among the auxiliary antennas. In one implementation, the IADM 114 identifies all the auxiliary antennas having the RSSI difference greater than the first threshold value as the potentially inactive antennas. Correspondingly, the IADM 114 identifies all the remaining auxiliary antennas, i.e., the auxiliary antennas having the RSSI value less than the threshold value as the active antennas. Identifying, the antennas having the RSSI difference greater than the first threshold value as the potentially inactive antennas helps in ensuring that the antennas receiving no or weak received signals are removed as being grounded or inactive. For example, the IADM 114 may compare the RSSI difference for the antennas 'B', 'C', and 'D' with the first threshold value to identify whether the antennas 'B', 'C', and D are active antennas or not. On comparison, the antennas, say the antennas 'B' and 'D', having the RSSI difference greater than the first threshold value, may be identified as potentially inactive antennas, whereas the antenna 'C' may be identified as an active antenna and added to the list of active antennas. The IADM 114 subsequently adds all the active antennas to a list of active antennas. In above example, the antenna 'C' may thus get added to the list of active antennas.

The potentially inactive antennas, thus identified, may be further analyzed by the IADM 114 to verify whether the potentially inactive antennas are inactive or not. In one implementation, the IADM 114 performs the verification for a particular potentially inactive antenna based on a variation in burst differences corresponding to each of the potentially inactive antennas. In one example, the burst difference for an antenna 104 may be understood as a difference between RSSI values of the consecutive bursts of the received signal corresponding to the antenna 104. For the purpose, the IADM 114 accesses the RSSI values of all the bursts of the received signal corresponding to each of the potentially inactive antennas based on RSSI values (not shown in the figure) generated by the RSSEM 112. For instance, the RSSEM 112 may estimate burst RSSI values corresponding to each of the potentially inactive antenna. Referring to the above example, for the antenna 'B,' the burst RSSI values may be estimated for first 'n' bursts of the received signal corresponding to the antenna 'B' as RSSI_B(1), RSSI_B(2), . . . RSSI_B(n).

The burst differences between consecutive bursts for each of the received signal are then computed by the IADM using the following formula:

$$\text{Burst\_Difference\_Ant\_}N(n,n+1) = \text{RSSI\_}N(n+1) - \text{RSSI\_}N(n) \quad (4)$$

Where, $\text{RSSI\_N}(n+1)$=RSSI value corresponding to $(n+1)^{th}$ burst of the antenna 'N'; $\text{RSSI\_N}(n)$=RSSI value corresponding to $(n)^{th}$ burst of the antenna 'N'; and Burst_Difference_Ant_N $(n, n+1)$=burst difference between the $(n)^{th}$ and $(n+1)^{th}$ burst of the antenna 'N'.

The IADM 114 thus computes burst difference between a plurality of bursts for each of the potentially inactive antennas to determine inactive antennas. In one implementation, the IADM 114 determines a variation in the burst differences for the received signal corresponding to each of the potentially inactive antennas. For instance, the IADM 114 may compute burst differences for consecutive bursts for antenna 'B' in accordance with equation (4) as:

$$\text{Burst difference}(B_1) = \text{RSSI\_}B(2) - \text{RSSI\_}B(1) \quad (4a)$$

$$\text{Burst difference}(B_2) = \text{RSSI\_}B(3) - \text{RSSI\_}B(2) \quad (4b)$$

$$\text{Burst difference}(B_n) = \text{RSSI\_}B(n) - \text{RSSI\_}B(n-1) \quad (4c)$$

The burst differences for consecutive bursts are computed and based on the same, a variation in the burst differences is determined. The variation in the burst differences may be computed using the following formula:

$$\text{Variation in burst difference}(\text{Antenna\_}N) = \text{Burst\_Difference\_Ant\_}N(n,n+1) - \text{Burst\_Difference\_Ant\_}N(n-1,n) \quad (5)$$

Thus, in the present example, the IADM 114 may determine the variation in burst difference i.e. $B_1, B_2, \ldots,$ and $B_n$ for antenna B in accordance with the equation 5.

The IADM 114 subsequently compares the variation in burst differences for each of the potentially inactive antenna with a second threshold value to determine whether the potentially inactive antenna is an inactive antenna or an active antenna. In one implementation, the IADM 114 may compare the variation in burst differences of only two consecutive bursts. Further, In another implementation, the IADM 114 may compare the variation in burst differences of two or more consecutive bursts. Further, the second threshold value, for example, may be determined based on one or parameters, such as system simulation or signal fluctuation observation. In one implementation, the second threshold value may be predetermined. In another implementation, the second threshold value may be dynamically determined.

Based on the comparison, the IADM 114 identifies all the potentially inactive antennas having the variation in the burst differences less than the second threshold value as the inactive antennas. On the other hand, the potentially inactive antennas having the variation in burst difference more than the second threshold value may be identified as the active antennas and added to the list of active antennas by the IADM 114. Identifying, the antennas having the burst differences less than the second threshold value as the inactive antennas helps in ensuring that the inactive antennas being removed as being grounded or inactive as input from the antennas receiving no or weak received signals is assumed to be noise that may almost remain constant for all the bursts. For example, the IADM 114 may compare the variation in bursts difference for the antennas 'B' and 'D' with the second threshold value to identify whether the antennas 'B' and 'D' are active antenna or not. On comparison, the antenna having the variation in burst difference less than the second threshold value say the antennas 'B', may be identified as an inactive antenna, whereas the antenna 'D' may be identified as an active antenna and added to the list of active antennas.

The IADM 114 may then provide an indication of the number of inactive antennas to the ESM 116. Based on the indication, the ESM 116 determines a number of active antennas from the multiple antennas 104. For instance, the IADM 114 may provide a list of active antennas and inactive antennas to the ESM 116, based on which the ESM 116 may directly calculate the number of active antennas. Alternately, the IADM 114 may provide a list of inactive antennas to the ESM 116, based. The ESM 116 may then subtract the number of inactive antennas from the number of multiple antennas 104 to determine the number of active antennas.

Based on the number of active antennas the ESM 116 may, in one embodiment, provide an equalizer initiation input to the EQM 110 to select an equalizer for equalizing the sampled data corresponding to active antennas. For instance, if only a single antenna is active, the ESM 116 may determine that a sampled data corresponding to the particular antenna may be equalized and provide a single antenna equalizer (SAEQ) initiation input to the EQM 110. Whereas, if more than one antenna is active, the ESM 116 may determine that sampled data corresponding to all the active antennas may be equalized and subsequently provide a multi-antenna equalizer (MAEQ) initiation input to the EQM 110. Additionally, the ESM 116 may provide the SAEQ initiation input or the MAEQ initiation input based on a set of predetermined parameters, such as default equalization mode. For example, the ESM 116 may be configured to select only a single-antenna equalizer, in such a case, the ESM 116 provide the SAEQ initiation input to the EQM 110 for using the sampled data corresponding to the primary antenna for equalization. Further, as the quality, i.e., RSSI value of the signal received by the primary antenna degrades, the ESM 116 may trigger the EQM 110 to switch to another antenna. Similarly, in one embodiment, the ESM 116 may be configured to identify antennas having RSSI value above a predetermined value as a set of optimum antennas, in such a case, the ESM 116 provides the MAEQ initiation input to the EQM 110 for using the sampled data corresponding only to the set of optimum antennas.

Based on the equalizer initiation input received from the ESM 116, the EQM 110 may select an equalizer for equalizing the sampled data corresponding to the active antennas. In one implementation, the EQM 110 includes a single antenna equalization module (SAEQM) 118 and a multi-antenna equalization module (MAEQM) 120 for equalizing sampled data associated with signals received by the communication device 102. For instance, the SAEQM 118 is configured to equalize sampled data corresponding to only a single antenna, while the MAEQM 120 is configured to equalize sampled data received from more than one antenna. Based on the equalizer initiation input received from the ESM 116, the EQM 110 may switch between the SAEQM 118 and the MAEQM 120.

For instance, on receiving the SAEQ initiation input, the EQM 110 initiates the SAEQM 118. The SAEQM 118 may then analyze the SAEQ initiation input to determine the sampled data corresponding to the primary antenna and subsequently equalize the sampled data. Further, as the quality, i.e., RSSI value of the signal received by the primary antenna degrades; the SAEQM 118 may switch to another antenna for equalization. Similarly, on receiving the MAEQ initiation input, the EQM 110 initiates the MAEQM 120. The MAEQM 120 may then analyze the MAEQ initiation input to determine all the active antennas and subsequently equalize the sampled data corresponding to the active antennas.

Additionally, the MAEQM 120 may be initially initiated for equalizing the sampled data, from say two antennas. However, on failure of one of the antenna, the EQM 110 may switch from the MAEQM 120 to the SAEQM 118.

Further, the communication device 102 includes a processor (not shown in figure) and a memory (not shown in figure) coupled to the processor. The processor can be a single processing unit or a number of units, all of which could include multiple computing units. The processor may be implemented as one or more microprocessors, microcomputers, microcontrollers, digital signal processors, central processing units, state machines, logic circuitries, and/or any devices that manipulate signals based on operational instructions. Among other capabilities, the processor is configured to fetch and execute computer-readable instructions stored in the memory. The memory may include any computer-readable medium known in the art including, for example, volatile memory, such as SRAMs and DRAMs and/or non-volatile memory, such as EPROMs and flash memories. In one implementation, the memory includes modules and data.

The modules, such as the RFEM 106, the AAD 108, and the EQM 110 include routines, programs, objects, components, and data structures, which perform particular tasks or implement particular abstract data types. The modules may also be implemented as, signal processor(s), state machines, logic circuitries, microprocessor(s), microcontroller(s), and/or any devices or components that manipulate signals based on operational instructions. Further, the communication device 102 can include a data module which, amongst other things, serves as a repository for storing data processed, received, associated and generated by one or more modules. The data module also includes temporary information generated as a result of the execution of one or more modules.

The communication device 102 is thus configured to detect activity of the multiple antennas 104. Detecting the antenna activity allows the communication device 102 to determine number of inactive and active antenna. The communication device 102 may accordingly switch between the SAEQM 118 and the MAEQM 120 for equalizing the sampled data corresponding to active antennas, thus improving the recovery of an estimate of the originally transmitted signal. Further, detecting the active antennas based on their RSSI values facilitates the communication device 102 to select and equalize the sampled data corresponding only to the set of optimum antennas. Alternately, reception of the input signal may be improved by weighing the received signals based on corresponding RSSI values and adding the received signals coherently before equalization. Further, detecting the inactive antennas may also facilitate in identifying faulty or grounded antennas, for example, during testing of the communication device 102. Additionally, detecting the grounded or faulty antennas may help in testing dual-antenna or multi-antenna communication devices, such as the communication device 102 for legacy tests.

Figure 2:
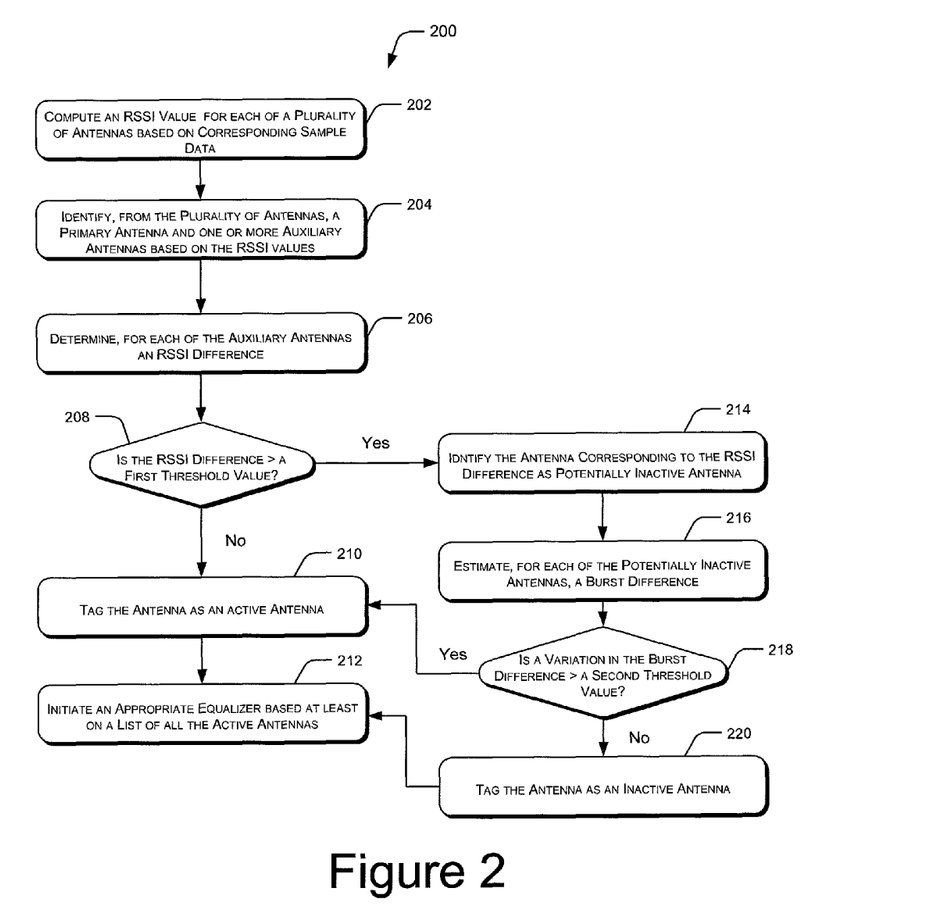
FIG. 2 illustrates a method for antenna activity detection in multi-antenna communication devices, according to an embodiment of the present subject matter.

FIG. 2 illustrates a method 200 for detecting antenna activity in a multi-antenna communication device, such as the communication device 102, in accordance with an embodiment of the present subject matter. Herein, some embodiments are also intended to cover program storage devices, for example, digital data storage media, which are machine or computer readable and encode machine-executable or computer-executable programs of instructions, wherein said instructions perform some or all of the steps of the described method. Further, the computer-executable programs are being loadable into a data-processing unit. The program storage devices may be, for example, digital memories, magnetic storage media, such as magnetic disks and magnetic tapes, hard drives, or optically readable digital data storage media.

The order in which the method is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof.

At block 202, an RSSI value for each of a plurality of antennas is computed. In one implementation, signals received by each of the antennas is processed and sampled to obtain sampled data corresponding to each of the antennas. The sampled data may include, for example, inphase (I) and quadrature phase (Q) signals corresponding each received signal. Based on the sampled data, the RSSI value may subsequently be computed for each of the plurality of antennas, for example, by the RSSEM 112. In one implementation, the RSSI value may be calculated using the equations (1) and (2) illustrated above.

At block 204, a primary antenna having a highest RSSI and one or more auxiliary antennas are identified from the plurality of antennas. In one implementation, the RSSI values corresponding to each of the antennas are compared, for example, by the IADM 114. Based on the comparison, an antenna corresponding to a highest RSSI value is identified as the primary antenna and may be provided for further processing. Further, antennas having the RSSI value less than the highest RSSI value are identified as the auxiliary antennas.

At block 206, an RSSI difference is determined for each of the auxiliary antennas. The RSSI difference for an antenna may be determined as a difference between the highest RSSI value, i.e., the RSSI value of the primary antenna, and the RSSI value corresponding to the antenna. In one implementation, the IADM 114 is configured to determine the RSSI differences for each of the auxiliary antennas. In one implementation, the RSSI differences may be calculated using the equation (3) illustrated above.

At block 208, a determination is made, for each of the auxiliary antennas, to ascertain whether the corresponding RSSI difference is greater than a first threshold value. For example, the IADM 114 compares the RSSI difference corresponding to each of the auxiliary antennas with the first threshold value, to ascertain whether the RSSI difference is greater than the first threshold value. If the RSSI difference is less than the first threshold value, which is the 'No' path from the block 208, it tags the corresponding antenna as an active antenna at block 210. From the block 210, the method proceeds to block 212.

In case it is determined that the RSSI difference is greater than the first threshold value, which is the 'Yes' path from the block 208, it identifies the corresponding antenna as a potentially inactive antenna at block 214. From the block 214, the method proceeds to block 216.

At the block 216, a burst difference is estimated for each of the potentially inactive antennas, for example, by the IADM 114. The burst difference for an antenna may be understood as a difference between RSSI values corresponding to consecutive bursts of the received signal corresponding to the antenna. In one implementation, the burst differences for each of the potentially inactive antennas may be calculated using the equation (4) illustrated above.

At block 218, a determination is made, for each of the potentially inactive antennas, to ascertain whether a variation in the burst differences is greater than a second threshold value. For example, the IADM 114 may determine a variation in the burst differences corresponding to a potential inactive antenna and then compares the variation with the second threshold value, to ascertain whether the variation is greater than the second threshold value. If the burst difference is less than the second threshold value, which is the 'No' path from the block 218, it tags the corresponding antenna as an inactive antenna at block 220. From the block 220, the method proceeds to block 212.

In case it is determined that the variation is greater than the second threshold value, which is the 'Yes' path from the block 218, it tags the corresponding antenna as an active antenna at the block 210. From the block 210, the method proceeds to the block 212.

At the block 212, an appropriate equalizer is initiated based at least on a list of the active antennas. In one implementation, the list of the active antennas and inactive antennas is provided, for example, to the ESM 116. Based on the lists, a number of active antennas is computed to determine whether a single antenna equalizer, such as the SAEQM 118 or a multi-antenna equalizer, such as the MAEQM 120 needs to be initiated. For instance, if a single antenna is active, the SAEQM 118 may be initiated, whereas if more than one antenna is active, the MAEQM 120 may be initiated.

The method 200 thus describes an embodiment for detecting antenna activity of corresponding to antennas of a multi-antenna communication device. Detecting the antenna activity allows determination of active and inactive antennas based on which a communication device may switch between a single antenna equalizer and a multi-antenna equalizer for equalizing sampled data corresponding to the active antennas. Recovery of an estimate of the originally transmitted signal may thus be improved.

Although implementations for detecting antenna activity in multi-antenna communication devices have been described in language specific to structural features and/or methods, it is to be understood that the appended claims are not necessarily limited to the specific features or methods described. Rather, the specific features and methods are disclosed as exemplary implementations for antenna activity detection.

We claim:

1. A method for antenna activity detection in multi-antenna communication devices, the method comprising:
   computing a received signal strength indicator (RSSI) value for each of a plurality of antennas based on a sampled data associated with each of the plurality of antennas;
   identifying, from the plurality of antennas, an antenna having a highest RSSI value as a primary antenna and one or more antennas having the RSSI value less than the highest RSSI value as auxiliary antennas;
   calculating an RSSI difference for each of the auxiliary antennas, wherein the RSSI difference corresponding to an auxiliary antenna is a difference between the RSSI value corresponding to the primary antenna and the RSSI value corresponding to the auxiliary antenna;
   comparing the RSSI difference corresponding to each of the auxiliary antennas with a first threshold value to ascertain one or more potentially inactive antennas from among the auxiliary antennas; and
   identifying, from the one or more potentially inactive antennas, one or more inactive antennas based at least in part on the RSSI value by
      estimating a plurality of burst differences for each of the one or more potentially inactive antennas, wherein a burst difference for a potentially inactive antenna is a difference between RSSI values of two consecutive bursts of a signal received by the potentially inactive antenna;
      determining, for each of the potentially inactive antennas, whether a variation in the plurality of burst difference is greater than a second threshold value; and
      tagging each of the potentially inactive antennas having the variation in the burst differences less than the second threshold value as an inactive antenna and each of the potentially inactive antennas having the variation in the burst differences greater than the second threshold value as an active antenna.

2. The method as claimed in claim 1, further comprising:
   determining a number of active antennas based on the tagging; and
   initiating an equalizer based at least on the number of active antennas.

3. The method as claimed in claim 1, wherein the computing the RSSI value comprises:
   determining, for each of the plurality of antennas, an estimated signal strength based at least on the sampled data, wherein the sampled data includes inphase and quadrature phase signals associated with received signal corresponding to each of the plurality of antennas; and
   compensating, for each of the estimated signal strength, a gain applied to the corresponding received signal to obtain the RSSI value for the antenna corresponding to the received signal.

4. A computer program product comprising a non-transitory computer readable medium, having thereon a computer program comprising program instructions, the computer program being loadable into a data-processing unit and adapted to cause execution of the method according to claim 1 when the computer program is run by the data-processing unit.

5. A method for dynamic selection of an equalizer in a multi-antenna communication device, the method comprising:
   identifying, based on a received signal strength indicator value corresponding to each of a plurality of antennas, one or more potentially inactive antennas from the plurality of antennas;
   tagging each of the potentially inactive antennas having a variation in burst differences less than a first threshold value as an inactive antenna and each of the potentially inactive antennas having the variation in the burst differences greater than the first threshold value as an active antenna, wherein a burst difference for a potentially inactive antenna is a difference between RSSI values of two consecutive bursts of a signal received by the potentially inactive antenna; and
   initiating an equalizer based at least on a number of antennas tagged as active antenna.

6. The method as claimed in claim 5, wherein the tagging comprises:
   estimating a plurality of burst differences for each of the one or more potentially inactive antennas; and
   determining, for each of the potentially inactive antennas, whether the variation in the plurality of burst differences is greater than the first threshold value.

7. The method as claimed in claim 5, wherein the identifying one or more potentially inactive antennas further comprises:
   computing the RSSI value for each of the plurality of antennas based on a sampled data associated with each of the plurality of antennas;
   identifying, from the plurality of antennas, an antenna having a highest RSSI value as a primary antenna and one or more antennas having the RSSI value less than the highest RSSI value as auxiliary antennas;
   calculating an RSSI difference for each of the auxiliary antennas, wherein the RSSI difference corresponding to an auxiliary antenna is a difference between the RSSI value corresponding to the primary antenna and the RSSI value corresponding to the auxiliary antenna; and
   comparing the RSSI difference corresponding to each of the auxiliary antennas with a second threshold value to ascertain the one or more potentially inactive antennas from among the auxiliary antennas.

8. A computer program product comprising a non-transitory computer readable medium, having thereon a computer program comprising program instructions, the computer program being loadable into a data-processing unit and adapted to cause execution of the method according to claim 5 when the computer program is run by the data-processing unit.

9. An antenna activity detector comprising:
   a processor, wherein the processor is coupled to a memory that stores a computer program, which when executed by the processor causes the processor to
   compute a received signal strength indicator (RSSI) value for each of a plurality of antennas based on sampled data associated with each of the plurality of antennas;
   identify, from the plurality of antennas, a primary antenna and one or more auxiliary antennas based on the RSSI values corresponding to each of the plurality of antennas, wherein the primary antenna is an antenna having a highest RSSI value, and wherein the auxiliary antennas are antennas having the RSSI value less than the highest RSSI value;
   ascertain one or more potentially inactive antennas from the auxiliary antennas based on the RSSI values;
   determine one or more inactive antennas from the one or more potentially inactive antennas, based at least in part on the RSSI values corresponding to each of the one or more potentially inactive antennas, wherein the determined one or more inactive antennas are faulty or grounded antennas;
   determine a number of active antennas based at least on an indication of one or more inactive antennas; and
   initiate an equalizer based at least on the number of active antennas.

10. The antenna activity detector as claimed in claim 9, wherein the computer program further causes the processor to,
   calculate an RSSI difference for each of the auxiliary antennas, wherein the RSSI difference corresponding to an auxiliary antenna refers to a difference between the RSSI value corresponding to the primary antenna and the RSSI value corresponding to the auxiliary antenna; and
   identify all the auxiliary antennas having the RSSI difference greater than a first threshold value as a potentially inactive antenna.

11. A communication device comprising:
   a processor, wherein the processor is coupled to a memory that stores a computer program, which when executed by the processor causes the processor to
   identify, from a plurality of antennas, a primary antenna and one or more auxiliary antennas based on received signal strength indicator (RSSI) values corresponding to each of the plurality of antennas, wherein the primary antenna is an antenna having a highest RSSI value, and wherein the auxiliary antennas are antennas having the RSSI value less than the highest RSSI value;
   ascertain one or more potentially inactive antennas from the auxiliary antennas based on the RSSI values;
   determine one or more inactive antennas from the one or more potentially inactive antennas based on a variation in at least two burst differences, wherein a burst difference for a potentially inactive antenna is a difference between RSSI values of two consecutive bursts of a signal received by the potentially inactive antenna; and
   select one of a single antenna equalization and a multi-antenna equalization based on the one or more inactive antennas.

12. The communication device as claimed in claim 11, wherein the computer program further causes the processor to,
   estimate the at least two burst differences for each of the one or more potentially inactive antennas and
   determine, for each of the potentially inactive antennas, whether a variation in the at least two burst differences is greater than a second threshold value.

13. The communication device as claimed in claim 11, wherein the computer program further causes the processor to compute the RSSI value for each of the plurality of antennas based on sampled data associated with each of the plurality of antennas.

14. The communication device as claimed in claim 11, wherein the computer program further causes the processor to,
   determine a number of active antennas based at least on an indication of one or more inactive antennas; and
   initiate selection of one of the single antenna equalization and the multi-antenna equalization based at least on the number of active antennas.

15. The communication device as claimed in claim 11, wherein the single antenna equalization equalizes sampled data associated with a received signal corresponding to the primary antenna.

16. The communication device as claimed in claim 11, wherein the multi-antenna equalization equalizes sampled data associated with received signals corresponding to at least two antennas selected from the active antennas.

17. The communication device as claimed in claim 11, comprising a receiver front-end configured to,
   down-convert for each of the plurality of antennas a corresponding received signal to obtain a baseband received signal; and sample the baseband received signal corresponding to each of the plurality of antennas to obtain the sampled data associated with each of the plurality of antennas.

* * * * *